C. B. LONG.
Gear Cutting Rule.
No. 47,436.  Patented April 25, 1865.
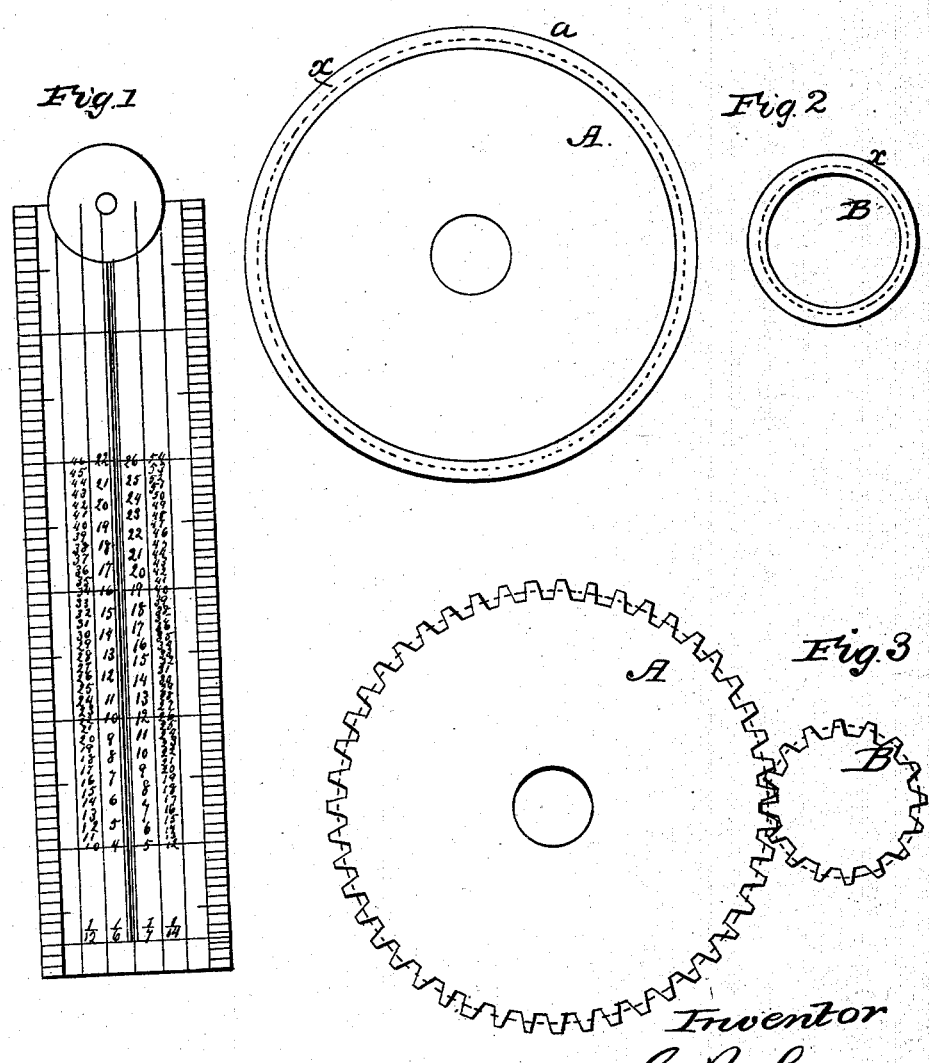
Witnesses
Geo. H. Miller
E. A. Wood
Inventor
C. B. Long
Thos. H. Dodge

UNITED STATES PATENT OFFICE.

C. B. LONG, OF WORCESTER, MASSACHUSETTS.

IMPROVEMENT IN GEAR-CUTTING RULES.

Specification forming part of Letters Patent No. 47,436, dated April 25, 1865.

*To all whom it may concern:*

Be it known that I, C. B. LONG, of the city and county of Worcester, in the State of Massachusetts, have invented certain new and useful Improvements in Gear-Cutting Rules; and I do hereby declare that the following is a full, clear, and exact description of the construction and operation of the same, reference being had to the accompanying drawings, in which—

Figure 1 represents a side view of my gear-cutting rule. Fig. 2 represents two wheels before the cogs are cut thereon. Fig. 3 represents said two wheels with cogs cut thereon and in gear.

In no part of a machine is so much difficulty met with as in the construction of gears principally for fine work. Any little variation in the pitch of the cogs or teeth or in the size of the blank from which the gear is to be cut is really a serious evil. If the pitch or cogs of one gear differ from those with which it is to mesh, then there is an undue friction, which contributes to the premature wearing out of both gears, while at the same time requiring much more power to operate the machine. Again, the same is true when the pitch is correct but the blank wheel happens to be turned a little too large or too small.

Some one of the foregoing objections is sure to follow unless the most careful calculations are resorted to in each case, and even then by the means resorted to in each case to aid in such matters but very few have been able to approximate a perfect result.

In the construction of gearing, it is well known that the number of cogs on a wheel depends on the length of its diameter and on the dimension of the pitch of the cog; and vice versa, the size of the wheel must be in proportion to a given number of cogs and to the length of their pitch. Based on the mathematical calculations required in such cases, and aided by practical experince, I have succeeded in perfecting a rule on which any mechanic can read at a glance the number of cogs when the diameter of the wheel and the pitch are given, or ascertain the diameter of the wheel when the number of cogs and their pitch are given.

In the rule shown in Fig. 1, I have represented two columns, in which the pitch of the wheel is one-twelfth and one-fourteenth of an inch or their multiples, as indicated by the numbers marked at the lower end of each column.

I have found it to be a correct rule that the number of cogs on a gear-wheel is equal to the number resulting from the division of the diameter of the blank wheel, less double the pitch expressed in inches by the pitch expressed in inches. This subtraction of twice the size of the pitch becomes necessary in each wheel, no matter what its size is, because the dimensions of the cogs are in theory applied not to the actual circumference of the blank wheel A, but to the theoretical line $x$, called the "pitch-line," from which all calculations relating to gearing should proceed, said line representing the theoretical line on which the power is transferred from one wheel to the other, and which determines the theoretical diameter of a gear-wheel. This deduction of twice the pitch is made on my scale on the first inch, which is therefore marked 12 on the column of one-fourteenth pitch, 5 on the column of one-seventh inch pitch, 10 on the column of one-twelfth inch pitch, &c.; and therefore no mistake can be made in using the rule for ascertaining the number of cogs or diameters of wheels which are one inch or more.

The use of this my scale will be readily understood by the following description.

In Fig. 2, A represents a blank wheel, the outer circle, $a$, of which represents the extreme diameter of the wheel when ready to be cut. A cog of one-fourteenth of an inch is thought to be wanted, and the number of cogs to be cut thereon is to be ascertained. By placing my rule across the diameter of the wheel it is found to measure three inches and one-half, and opposite to said mark, and on the one-fourteenth column of the scale, will be found the number 47, which indicates the number of cogs which can be cut thereon of one-fourteenth of an inch pitch, and it will be observed that said number, forty-seven fourteenths, is just equal to the diameter of the wheel divided by one-fourteenth, measuring from the pitch-line $x$ of the wheel.

In Fig. 1 the first inch on the right-hand side of the rule is marked 12, which gives the number of cogs of one-fourteenth pitch which can be cut upon a blank wheel of one inch in diameter; after this, each inch will add fourteen cogs, and is so marked. On the left of the one-fourteenth numbers are those for one-seventh of an inch pitch, and the first inch is marked 5; each inch after adds seven cogs. The same is true of the left-hand side of the rule, which is marked for one-sixth and one-twelfth inch pitch cogs. Rules may be made of any desired size and shape, and as extensive as may be desired, without departing from the principle of my invention.

To further illustrate the utility of my invention and to show the application of my rule, let it be desired that a small gear should be cut to mesh into the large gear A, and with such a number of cogs that it would be turned twice and fifteen-sixteenths of a revolution, when the large wheel makes one revolution. The number of cogs in the large wheel being known, (47,) the number of cogs on the small wheel is found by an easy calculation to be sixteen, but the precise diameter to which the blank wheel B must be turned is not ascertained as easily. With the aid of my rule, any person, however unskilled in mathematics, can ascertain said diameter by looking at the rule and by noting on the one-fourteenth column the number of inch opposite the number 16, which is found to be one and four-fourteenths of one inch, which is the extreme diameter of the blank of the small wheel B.

In Fig. 3 the two wheels are represented with the cogs cut thereon and in gear, in conformity with the above rules, showing the proportions and perfect gear of said wheels.

Thus, by the aid of my rule, any mechanic of ordinary skill can quickly ascertain the number of cogs of a given pitch to be cut on a blank wheel of a given size, or the diameter of the blank wheel when the number of cogs and their pitch is given.

Having thus fully described the nature of my invention, what I claim herein as new, and desire to secure by Letters Patent, is—

1. A gear-cutting rule upon which is marked in figures the number of cogs of a given pitch which can be cut upon a given diameter of a wheel, substantially as and for the purposes described.

2. Marking the first inch of the rule with a figure or figures to indicate the number of cogs of a given pitch which can be cut upon a wheel of one inch in diameter, with allowances for pitch-line, substantially as set forth.

C. B. LONG.

Witnesses:
   Thos. H. Dodge,
   J. Henry Hill.